March 25, 1947. S. H. A. YOUNG 2,417,851
SELECTIVE IMPREGNATION OF ACCRETED FIBROUS PLASTIC ARTICLES
Filed July 13, 1942 3 Sheets-Sheet 3

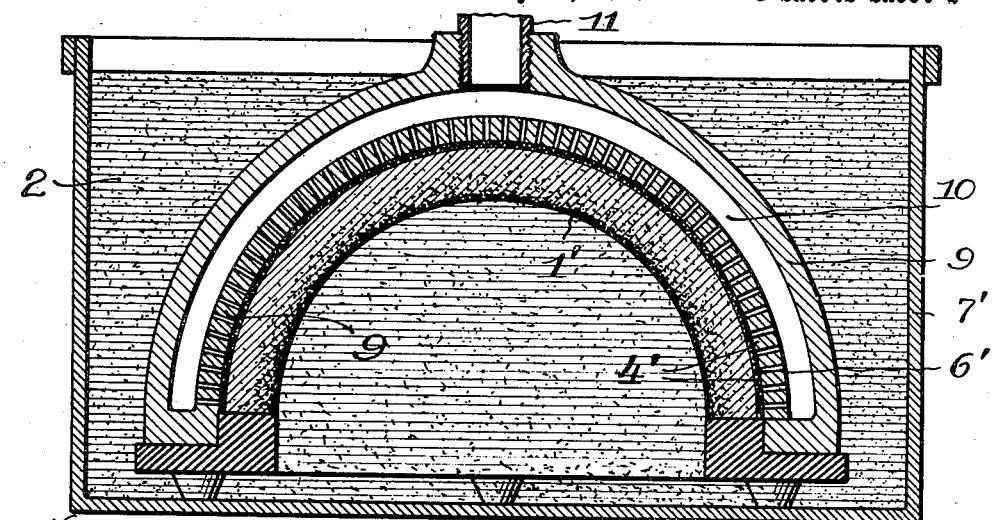
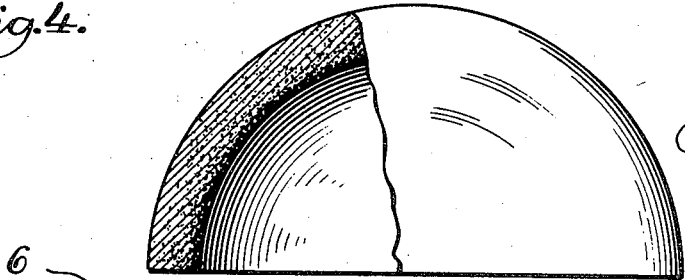
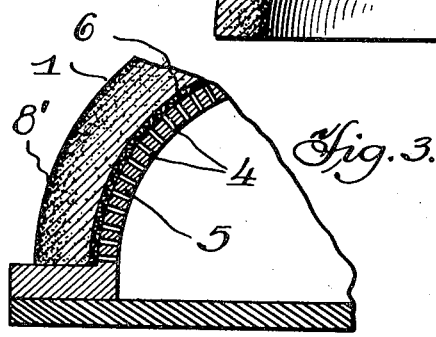
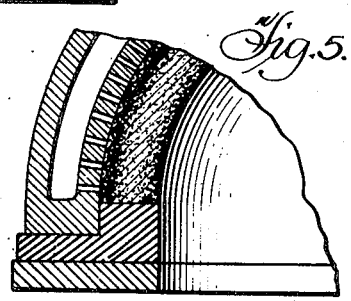
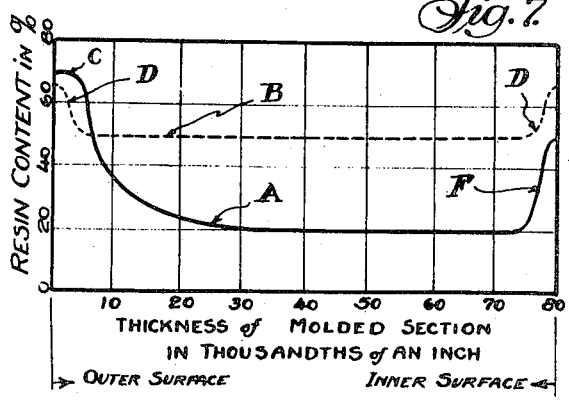

Witness:

INVENTOR.
Serenus H. A. Young
BY Parkinson & Lane
Attys

Patented Mar. 25, 1947

2,417,851

UNITED STATES PATENT OFFICE 2,417,851

SELECTIVE IMPREGNATION OF ACCRETED FIBROUS PLASTIC ARTICLES

Serenus H. A. Young, Geneva, Ill., assignor, by mesne assignments, to Hawley Products Company, a corporation of Delaware Application July 13, 1942, Serial No. 450,788

2 Claims. (Cl. 92—55)

This invention relates to the art of accreting, treating with resin, drying, and molding contoured plastic articles, and more particularly to the selective incorporation of resins in the accreted, contoured, fibrous pulp preforms.

One of the objects of my invention is to provide a means and method whereby in a simple operation or operations the actual resin content of an accreted resin-fiber preform may be varied throughout the section, with particular attention being given to obtaining a good molded surface on the article and at the same time obtain a good degree of strength in the interior of the body of the finished article.

In the present invention I have provided a fiber plastic accreted article having excellent general strength characteristics in which the resin content of the greater part of the cross-section of the article is held to a value of approximately 10 to 30 percent by weight, which is the range most productive of the best physical characteristics. As shown hereinafter, there is no definite demarcation line between the resin existing at the surface of the article and the resin existing in the subsurface portion of the article.

This invention is not limited to the use of any particular type of resin, but specifically encompasses the use of resins in both thermoplastic and thermosetting types.

A further object of the present invention is to provide a method by which articles of the class herein described, may be produced in such manner as to provide a continuous, unbroken molded resin film on the surface of the article while at the same time the resin content of the subsurface portions of the article contain much less resin.

A still further object is to provide the above mentioned surface characteristics on both the inner and outer surfaces of a resin fiber plastic article, while at the same time the subsurface portions contain a comparatively small amount of resin.

Another object is to provide means for securing a very thorough bond between the surface resin and the subsurface portions of the article, said bond having no specific cleavage plane, because the resin concentration or actual resin content at the surface is very high, for example, of approximately 50 to 80 percent by weight, this concentration decreasing rapidly as the resin surface film penetrates or impregnates the accreted fiber preform.

Other objects, advantages and capabilities will later more fully appear.

In the drawings:

Fig. 3 is a view similar to Fig. 2 but showing in section only a fragmentary portion of the suction die and preform carcass, and with a less amount of the resin deposited on and near the surface, the resin like in Fig. 2 progressively lessening in amount toward the inside.

Fig. 4 is a view similar to Fig. 1 but showing the parts so constructed and arranged as to pull the resin bath through the preform carcass from its inside surface.

Fig. 5 is a fragmentary sectional view of a suction die showing a preform carcass which had previously had the resin bath pulled through from the outer surface and then placed in the die and the resin bath then pulled through from the inner surface in accordance with the present invention.

Fig. 6 is a view partly in elevation and partly in section of a preform similar to that shown in Fig. 5 but showing a less amount of resin deposited on and near the outer and inner surfaces.

Fig. 7 is a diagrammatic view illustrating two graphs or curves showing the resin content through the thickness of a molded section with and without my invention.

Figure 1:
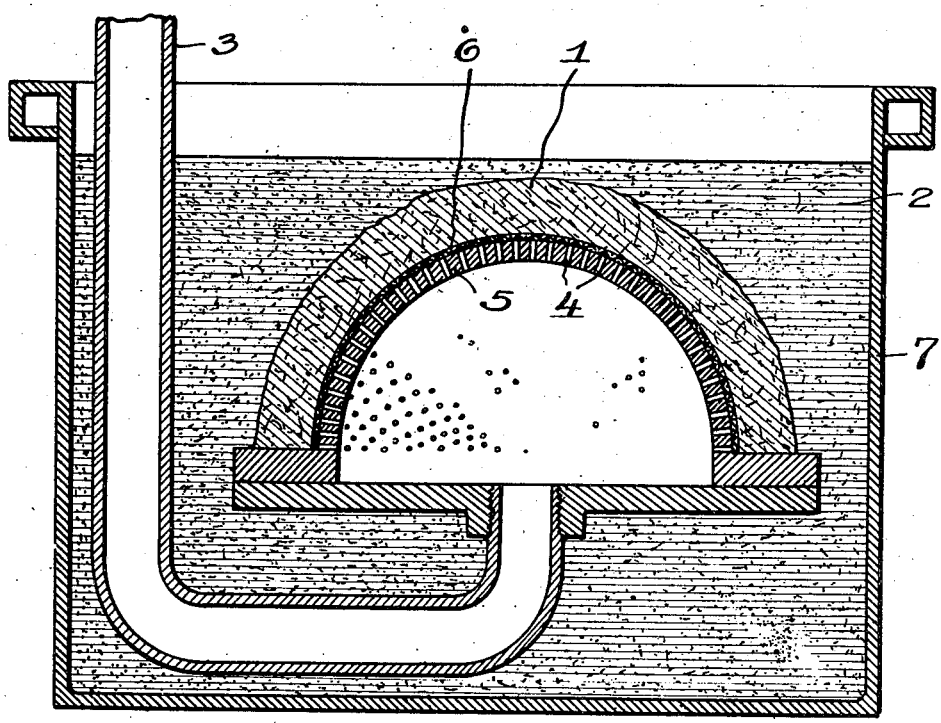
Fig. 1 is a vertical transverse section through a tank containing a resin bath and showing a porous form on which the preform carcass is in position to have a portion of the resin bath pulled therethrough by suction.

The accreted, contoured preform 1 will be accreted onto a former by sucking through the openings in it and which is placed in a fibrous pulp bath, the liquid, and depositing thereon fibers to the desired thickness. While Fig. 1 represents a tank containing a resin bath and means for drawing or pulling the resin bath through the fibrous preform in accordance with my invention, in order to lessen the number of views in the drawing, it is to be understood that the resin bath 2 of Fig. 1 may also represent a fiber pulp bath without resin therein, in which, by the application of suction through the pipe 3 from any suitable suction means (not shown), the water, or other liquid, of the bath will be drawn through the openings 4 in the porous former or suction die 5 (which may also be a conforming die), the fibers being deposited against and on the outside of the screen 6 which prevents the fibers from passing through the holes 4. The tank 7 forms the containing means for the resin bath 2, which bath, as previously stated may be a fiber pulp bath when the apparatus of Fig. 1 is being used for accreting a preform carcass.

A number of tanks 7 may be provided, one or more for accreting preforms, and one or more for applying the resin to the preform. When the preform carcass has been accreted and raised out of the pulp bath, the preform carcass will be removed from the porous accreting former and placed on a suction die 5 and with suction applied through the pipe 3 lowered into the resin bath 2, and the suction continued to pull the resin solution portion of the bath through the preform, the interstitial water in the interstices of the preform from the accreting bath being displaced (through suction) by the water from the resin bath, and the suspended particles of the water dispersible resin in the bath being deposited to a greater degree on the outer surface and selectively decreasing progressively inwardly. The same results may be attained by leaving the carcass on the accreting former and subjecting the carcass while on this former to the resin bath.

Figure 8:
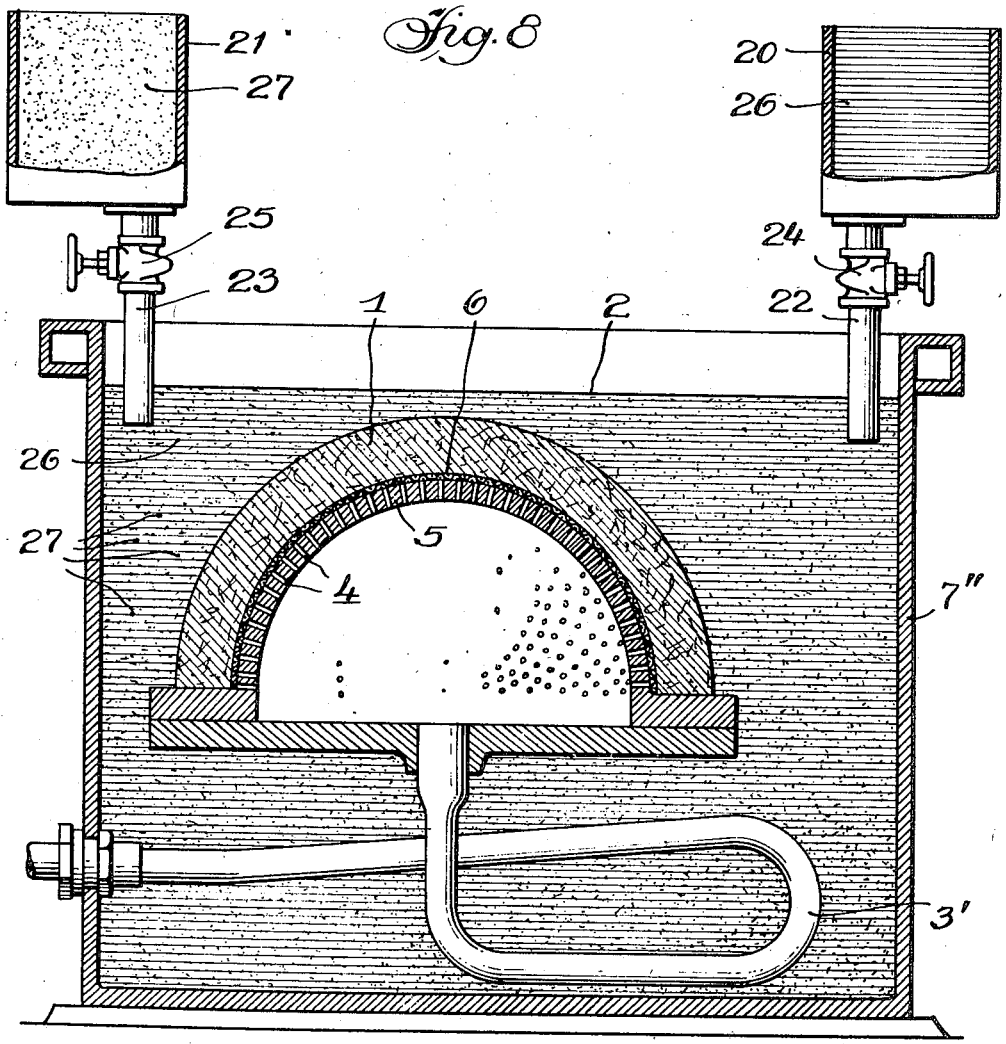
Fig. 8 is a vertical transverse section through a main tank and two auxiliary tanks for carrying out the steps of my invention.

The nature of the bath 2, and the selective impregnation of the present invention will be better understood in Fig. 8, which shows a tank 7″ generally similar to the tank 7 of Fig. 1 and the tank 7′ of Fig. 4. These tanks, as shown in Fig. 8, contain the bath 2 which consists of a mixture (in selective proportions) of resin-water solution and a liquid containing in desired and selectable proportion water-dispersible resin. This mixture bath 2 is made up by introducing into tank 7″ the resin-water solution from auxiliary tank 20 in the desired proportion, and introducing into tank 7″ the liquid and water-dispersible resin from auxiliary tank 21 in the desired proportion. Tank 20 is provided with a pipe 22 communicating therewith and having an open end leading into the interior of tank 7″. A pipe 23 leads from tank 21 to the interior of tank 7″. Pipe 22 is provided with a valve 24 and pipe 23 is provided with a valve 25, whereby the desired relative proportion of liquid or vehicle from tanks 20 and 21 may be passed into tank 7″ by the selective opening and closing of valves 24 and 25.

Tank 20 (which like tank 21 may be of any desired length or cubical content) contains a liquid suitable for the purpose intended and in which is dissolved a water-soluble resin. For brevity the contents of tank 20 will be hereinafter referred to as the resin-solution bath. Tank 21 contains a liquid suitable for the purpose intended and in which is introduced in desired amount water-dispersible resin. For brevity the contents of tank 21 will be hereinafter referred to as the water-dispersible resin bath. The resin-solution bath in tank 20 may be of any desired strength of resin, for example, preferably from 5 to 35 per cent of water-soluble resin to 95 to 65 per cent of water or other liquid, by weight, which percentages may be selectively varied as desired.

Figure 9:
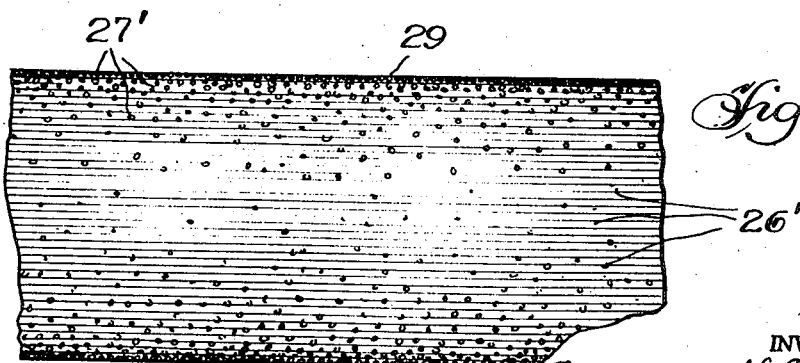
Fig. 9 is a fragmentary enlarged cross-section through a portion of a preform carcass after having the resin incorporated therein, but before the preform is molded under heat and pressure.

The water-dispersible resin bath in tank 21 may be of any desired strength of water-dispersible resin, for example, preferably from 5 to 35 per cent of resin to 95 to 65 per cent of water or other liquid, by weight, which percentages may be selectively varied as desired. When suction, from any suitable source, is applied through the flexible tube 3′ in tank 7″, or the pipe 3 in tank 7, or the pipe 11 in tank 7′, the resin-solution bath portion of the mixture bath 2 will be pulled through the interstices between the fibers of the preform 1 and fill the same throughout the thickness of the preform. Also the suspended fine resin particles in the water-dispersible resin bath portion of the mixture bath will be deposited in a layer 29 upon the outer surface of the outer layer of fibers as seen in Fig. 9, in a high degree of concentration, and said suspended resin particles in the bath will in a progressively decreasing degree of concentration also continue inwardly into the preform until only a few of said particles are found and finally none of said particles are found in the central portion of the preform. Or if a larger relative proportion of the resin particles are selectively introduced into the bath mixture 2, a larger portion of said particles will find their way through the interstices between the fibers in the preform in decreasing amount, so that by selecting, as desired, the amount of resin particles or concentration in the bath mixture a greater or less amount of resin will be impregnated into the preform, with the greater degree of concentration on the outer surface, and the degree of concentration thereof progressively decreasing toward the inside substrata or middle portion of the preform.

Likewise the percentage of resin in the resin-solution bath may be decreased or increased as desired, thus selectively impregnating the same throughout the thickness of the preform in greater or less degree of resin content.

It is thus seen that the impregnation of the resin into the preform can be controlled selectively by selectively controlling the relative proportions of the resin-solution bath and the water-dispersible resin bath in the mixture bath 2, and by controlling selectively the suction and the time of application of the suction through the preform in the bath, and controlling selectively the proportion of resin in one or both of the baths in the auxiliary tanks 20 and 21, and other modes of selective control of which the present invention may be susceptible.

For convenience the resin-solution bath in auxiliary tank 20 and in tank 7″ of Fig. 8 have been shown in fine parallel horizontal lines 26, and in the auxiliary tank 21 and in the tank 7″ of Fig. 8 the suspended resin particles of the water-dispersible resin bath are indicated as small dots 27. Also for convenience in Fig. 9 the fine parallel lines 26′ represent the resin of the resin-solution bath 26 "pulled through" the preform, and 27′ represent the resin particles 27 after they have been drawn by suction onto and in the preform, all in the one suction operation in the bath 2. As seen in Fig. 9 the resin 26′ of the resin-solution bath will extend substantially uniformly throughout the thickness of the preform because of the resin-solution bath being "pulled through" by suction, while the resin particles 27′ will be more concentrated on the outer surface and which degree of concentration will progressively diminish inwardly. Also the suction may be applied first from the outside as in Figs. 1, 2 and 8, and if desired from the inside as in Fig. 4, thus producing the selective impregnation from both sides as seen in Fig. 9. As will be understood from the above, my novel selective impregnation may be applied to one side only, or to both sides of the preform as desired.

When the preform thus treated is molded between a pair of dies under heat and pressure of the required amount, the resin will melt and flow around the fibers thus filling the interstices between the fibers on the surface of the molded article and producing a surface finish of high quality, while the amount of resin will progressively diminish from the surface inwardly to produce a less dense and stronger interior as pointed out earlier herein. Also there will be no definite demarcation lines or planes between the surface and the interior.

Figure 2:
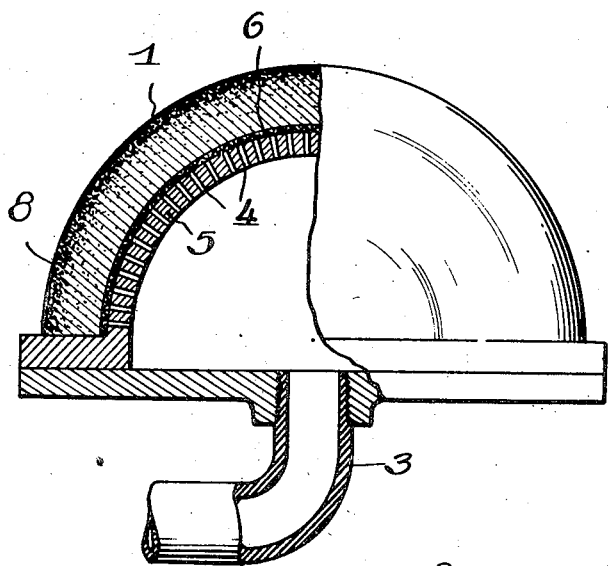
Fig. 2 is a fragmentary view partly in section and partly in elevation of a suction die having a preform carcass thereon and through which the resin bath has been pulled and showing in section the preform having a considerable amount of resin on and near the outside, which resin progressively lessens in amount toward the inside.

In Fig. 2 the greater concentration of resin in and near the surface of the preform is designated as 8, and the lesser concentration of resin in and near the surface in Fig. 3 is designated as 8', the direction of suction in the resin bath in Figs. 1, 2 and 3 being from the outside of the preform toward the inside.

In Fig. 4 the resin bath tank 7' contains a resin bath 2, which may be the same as the bath in Figs. 1 and 8 or not, as desired. Also in Fig. 4 is shown a female suction die 9, provided with drainage holes 4' and a screen 6', which openings communicate with a space 10 leading to the passageway in the pipe 11 connected with any suitable source of suction. This suction die is movable into and out of the resin bath as desired, as is the suction die shown in Fig. 1. The preform 1' shown in Fig. 4 may be accreted on a male former of the type shown in Fig. 1 and after removal, then inserted within the female suction die of Fig. 4, or it may be accreted onto the inside of a female accreting form of the general type shown in Fig. 4, and then moved together with the accreting form into the resin bath, or removed from the accreting form and placed within the suction die shown in Fig. 4.

Suction through the suction die of Fig. 4 will deposit the greater concentration of resin on and near the inner surface of the preform as seen in Fig. 4, the degree and depth of such concentration being selectively controlled in the various ways set forth herein, as well as other ways falling within the spirit of my invention.

Also the preform may be selectively impregnated from one side as shown in Figs. 1, 2, 3, and 4, and then removed from the male suction die and placed within a female suction die (if the first impregnation was done on a male suction die, or placed on a male suction die if the first impregnation was done on a female suction die) and the other side selectively impregnated with resin in the manner already described for the first side. In this manner one side of the preform may be a greater or less degree of impregnation as desired, or one side left unimpregnated.

In Fig. 7 are illustrated two curves plotted with relation to the resin content in per cent (plotted as ordinates) and the thickness of the molded section (plotted as abscissas), wherein curve A (in solid line) shows a typical curve obtained through the use of selective impregnation in accordance with the present invention, and curve B (in dotted line) shows a typical curve obtained by using the old dipping or immersion method in a resin solution. As will be understood in Fig. 7, and referring to curve A, the kind and quantity of resin and the mode of handling the same and the bath, are such as to produce the desired degree of concentration of resin on and in the entrance surface as indicated at C, which degree of concentration progressively decreases inwardly into the inner portion or subsurface of the molded article, thus giving the desired high quality to the outer surface and the greater strength in the inner portions. Due to the heat and pressure used in molding, the surfaces of the article in contact with the molding die faces will show slightly higher resin values at the surfaces in average molding as seen at DD in curve B, and F in curve A. However, this is not to be confused with the high resin value at the region C of curve A, which is of the greater degree of concentration of resin because of the use of the selective impregnation of the present invention.

As stated earlier herein, by the use of this selective impregnation of resin in fibrous articles, I am able to control the amount of resin concentration at various portions of the thickness of the molded article, and thus control the quality of the surface of the molded article, the strength of the interior, as well as other combinations and advantages possible in the present invention.

By the term "water-dispersible" as here used is meant a resin which is substantially insoluble in water. By "water soluble" resin is meant one that readily dissolves in water. By the predetermined selection of the amounts, proportions and kinds of resin, the degree and time of suction, and other factors, I am able to produce to a fine degree of perfection, and within a wide range of requirements, just what is wanted to meet the different commercial requirements as to finished product.

Having now described my invention, I claim:

1. In the method of impregnating a fibrous-plastic article, the steps of providing a predetermined mixture of liquid, water soluble and water dispersible resins containing resin particles in suspension, placing an accreted preformed fibrous carcass containing water from an accreting process in its interstices on a suction die having a surface contour corresponding to the shape of the carcass but with openings therethrough, immersing the suction die and carcass into a bath of the mixture, creating a suction through the suction die and the interstices of the porous fibrous carcass while in the bath and drawing a solution of water soluble resin from the mixture into and through the carcass thereby replacing the interstitially held water and simultaneously selectively coating and impregnating the carcass with suspended particles of water dispersible resin and providing the surface of the carcass with a high concentration of the suspended particles progressively decreasing from the surface inwardly to substantially the center of the carcass, and thereafter removing said carcass from the suction die.

2. The method of claim 1 in which the carcass is thereafter placed on another suction die; the step of applying suction in the opposite direction while the carcass is immersed in a bath of the mixture, to provide the surface opposite the first mentioned surface with a high concentration of suspended particles progressively decreasing from said surface inwardly to substantially the center of the carcass.

SERENUS H. A. YOUNG.

REFERENCES CITED

The following references are of record in the file of this patent:

UNITED STATES PATENTS

| Number | Name | Date |
| --- | --- | --- |
| 1,998,539 | Gams et al. | Apr. 23, 1935 |
| 2,042,299 | Ellis | May 26, 1936 |
| 867,389 | Lorenz | Oct. 1, 1907 |
| 1,401,979 | Winnertz et al. | Jan. 3, 1922 |
| 2,159,638 | Schur | May 23, 1939 |
| 2,274,095 | Sawyer | Feb. 24, 1942 |
| 1,974,898 | Rutledge | Sept. 25, 1934 |
| 2,163,585 | Chaplin | June 27, 1939 |